April 21, 1925.
F. E. TROUTMAN ET AL
1,535,063
METHOD OF LAYING PLATE GLASS
Filed Jan. 20, 1923   2 Sheets-Sheet 1
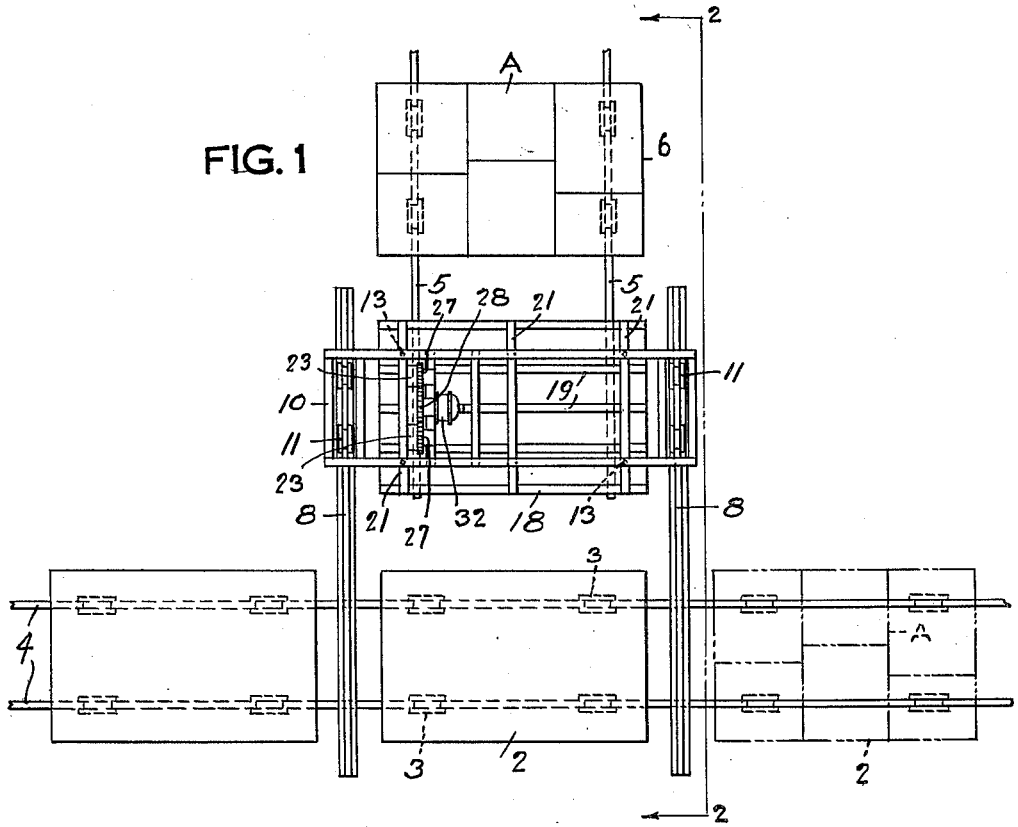
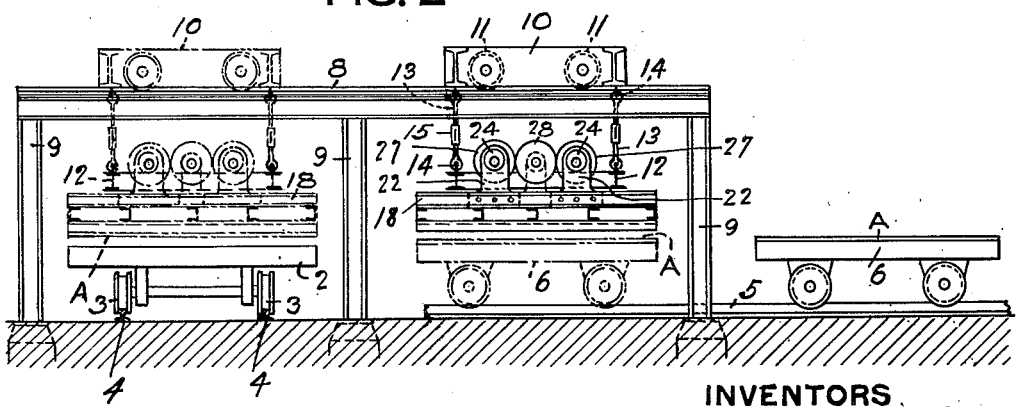
INVENTORS
Frank E. Troutman and
Charles N. Christie,
By Kay, Totten, Brown,
Attorneys April 21, 1925. 1,535,063
F. E. TROUTMAN ET AL
METHOD OF LAYING PLATE GLASS
Filed Jan. 20, 1923 2 Sheets-Sheet 2
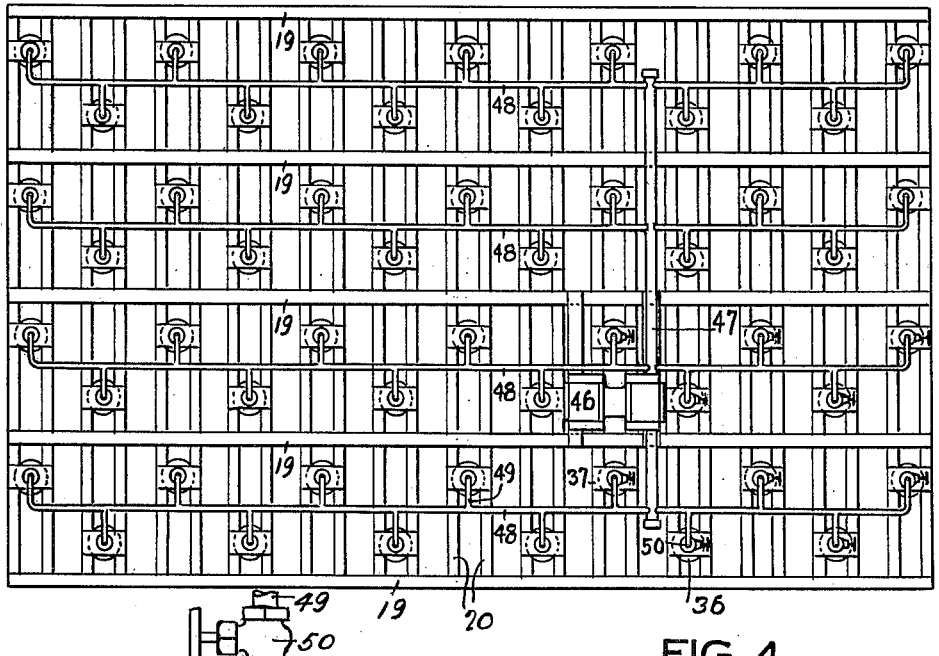
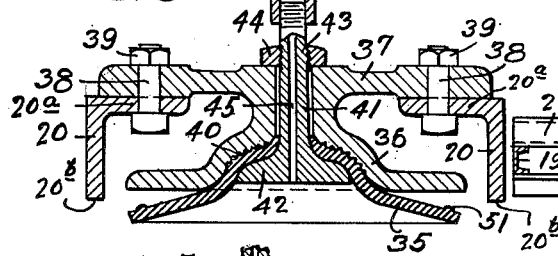
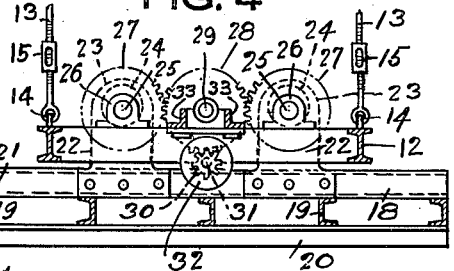
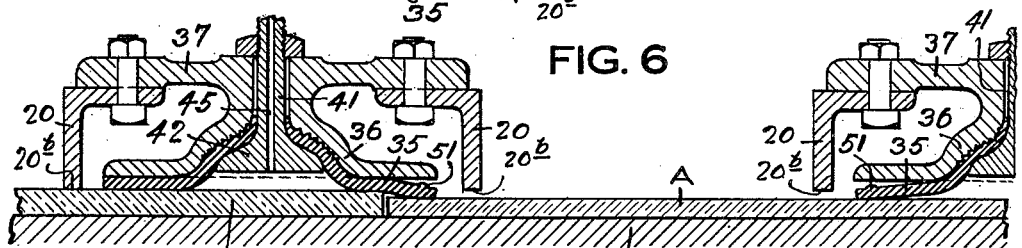
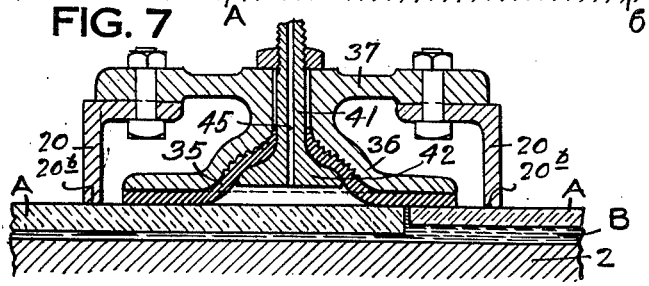
INVENTORS
Frank E. Troutman
Charles H. Christie,
By Kay, Totten & Brown
Attorneys Patented Apr. 21, 1925.

1,535,063

UNITED STATES PATENT OFFICE.

FRANK E. TROUTMAN AND CHARLES H. CHRISTIE, OF BUTLER, PENNSYLVANIA.

METHOD OF LAYING PLATE GLASS.

Application filed January 20, 1923. Serial No. 613,948.

*To all whom it may concern:*

Be it known that we, FRANK E. TROUTMAN and CHARLES H. CHRISTIE, citizens of the United States, and residents of Butler, in the county of Butler and State of Pennsylvania, have invented a new and useful Improvement in Methods of Laying Plate Glass; and we do hereby declare the following to be a full, clear, and exact description thereof.

Our invention relates to the manufacture of plate glass and other forms of flat glass, and its object is to provide an improved method of laying such glass on grinding or polishing tables whereby several sheets of glass may be laid in plaster on the table with their upper surfaces at an even height, whether the individual sheets are of exactly the same thickness or not.

Plate glass is laid on grinding and polishing tables in plaster. This is done by pouring the plaster on the table, then laying each piece of glass separately upon the plaster and bringing the glass into its proper place by a process of pushing and tramping which is known in the glass industry as "swimming" the glass. This operation of laying each piece separately takes considerable time, and as the plaster sets very quickly, some of the plaster is wasted and must be scraped off the table before the next piece is laid. If one piece of glass is a trifle thicker or thinner than the others, an uneven surface is produced, and this unevenness is often very serious unless the greatest care is taken to match the pieces of glass before they are laid. In practice, it generally takes 10 to 20 minutes of grinding to bring the highest plates down to the level of the low ones, and the time and expense thus wasted are very considerable.

According to our present invention, we lay the glass for a whole table at one time, and we do this in such a way that the top surfaces of all the pieces of glass are even with each other, thus saving labor, plaster, and the time consumed in laying the pieces one by one and in grinding away the extra thickness of the heavy pieces. We obtain these results by matching and laying the glass on a table without plaster, then lifting all of the pieces of glass simultaneously by means of vacuum cups carried by a frame which determines the height of the upper level of all of the pieces of glass, transferring the glass to a position above another table which has been covered with plaster or moving the plaster-covered table beneath the frame, lowering the frame to bring the glass into contact with the plaster, and then moving the frame horizontally so as to force the air out from beneath the glass, as in the ordinary swimming operation. The glass is held by suction until the plaster is sufficiently set to support the glass, after which the vacuum cups are released and the frame is removed, leaving the glass upon the grinding table with an even upper surface. When this surface has been ground the glass is removed from the table, inverted upon the preliminary or assembling table, and is again laid for grinding in the same manner as before.

The apparatus required for carrying out my present method is described and claimed in our copending application for Letters Patent, Serial No. 613,949, filed January 20, 1923. An example of such apparatus is also shown in the accompanying drawing, in which Fig. 1 is a plan view of a complete set of tables and pneumatic transfer mechanism; Fig. 2 is a side view of the same construction with parts in section on the line 2—2, Fig. 1; Fig. 3 is an enlarged plan view of the pneumatic transfer device; Fig. 4 is an enlarged side view of the motor and gearing for raising and lowering the suction frame; Fig. 5 is a still more enlarged vertical sectional view through one of the vacuum cups; Fig. 6 is a vertical sectional view showing the manner in which the vacuum cups engage pieces of glass of different thicknesses; and Fig. 7 is another vertical sectional view, similar to a portion of Fig. 6, showing the manner in which the upper surfaces of sheets of different thicknesses are brought to the same level.

In the drawing the numeral 2 indicates a table such as is ordinarily used for grinding and polishing plate glass, this table being provided with wheels 3 running on tracks 4. The table 2 may be rectangular, as shown, or may be circular or otherwise shaped, as may be desired. A second pair of tracks 5 is arranged perpendicular, parallel or otherwise adjacent to the tracks 4, and a table 6 which may be similar to the table 2 is arranged to run on the tracks 5 between the positions shown in full lines and dotted lines on Fig. 2.

Overhead tracks 8 mounted on supports 9 extend across the tracks 4 and beside the tracks 5. A crane 10 provided with wheels 11 running on the tracks 8 is arranged to travel between the full-line position shown in Fig. 2, where it is above the tracks 5, to the position shown in dotted lines on Fig. 2, where it is above the tracks 4. A rectangular frame 12 is suspended from the crane 10 by means of rods 13 which are provided at their upper and lower ends with eyes engaging eye-bolts 14 or the like carried by the crane 10 and the frame 12, respectively. The vertical length of the rods 13 is made adjustable by means of turnbuckles 15. This arrangement provides for a certain amount of horizontal swinging movement of the frame 12 while maintaining this frame always level.

As best shown on Fig. 4, the frame 12 carries another frame 18 which is movable vertically with respect to the frame 12 and carries a series of vacuum cups arranged to lift and transport the pieces of glass in the manner described above. The frame 18, as shown, is composed of longitudinal channel bars 19 and transverse angle bars 20 arranged in pairs beneath the longitudinal bars 19. Other transverse bars 21 are secured to the upper flanges of the channel bars 19 and serve to support suspension members 22 which carry bearings 23 provided at their upper ends with circular seats in which are received eccentrics 24 carried by horizontal shafts 25 that are mounted in bearings 26 carried by the frame 12. The shafts 25 also carry spur gear wheels 27 meshing with an intermediate gear wheel 28 on a shaft 29. The gear wheel 28 meshes with a pinion 30 on the armature shaft 31 of an electric motor 32 which is suspended beneath transverse angle bars 33 forming part of the frame 12.

The motor and gearing just described provide means for raising and lowering the frame 18 which carries the vacuum cups. When the motor 32 is started the pinion 31 acts through the gear wheel 28 to rotate the gear wheels 27 and consequently the shafts 25 and the eccentrics 24, thus changing the angular position of the eccentrics 24 and raising or lowering the frame 18. The motor 32 is provided with the usual circuit connections and reversing switch, which it is not considered necessary to illustrate herein.

The transverse angle bars 20 of the frame 18 serve the double purpose of supporting the vacuum cups and of determining the upper level of the glass that is to be laid, the cups being supported upon the upper horizontal flanges 20ª of these bars, while the lower edges 20ᵇ of the vertical flanges serve as limit-stops to fix the upper level of the glass.

The construction of the vacuum cups is best shown in Figs. 5 to 7. Each of these devices consists of a suction cup 35 composed of rubber or other elastic material and carried by a rigid housing 36 which conforms to the shape of the rubber cup 35 and is suspended from a plate 37 which extends across the space between a pair of the angle bars 20 and is removably fastened to the upper flanges of these bars by means of bolts 38 and nuts 39. The under surface of the hollow central portion of the housing 36 may be provided with saw-tooth grooves 40 in order to prevent relative movement between the rubber cup 35 and the housing 36 when the apparatus is in use. The rubber cup 35 is removably secured within the housing 36 by means of a stem 41 having an enlarged head 42 and a screw-threaded outer portion 43 to which is applied a nut 44. The stem 41 has a central channel 45.

All of the vacuum cup devices just described are connected by means of suitable pipes and valves to a suction pump 46 carried by the frame 18. As shown, a manifold or header pipe 47 extends the full width of the frame 18 and communicates with longitudinal pipes 48 which in turn communicate with the individual vacuum cups through branch pipes 49 controlled by means of valves 50. The individual valves 50 are provided in order to put out of action any of the suction cups which may happen to be above the cracks between the pieces of glass that are to be transported, thus preventing the vacuum from being broken by air drawn up through these cracks.

Each of the rubber vacuum cups 35 is preferably provided with one or more annular ribs 51 extending around its upper surface near its outer edge. This rib acts as a sealing ring when the cup is forced down upon the glass and insures that proper suction will be produced even though the upper surface of the glass may be slightly wavy or rough.

In carrying out my invention by means of the apparatus described above, the plates or pieces of glass are first laid side by side on the table 6 without the use of any plaster, as shown for example at A on Fig. 1. The table 6 is then moved from the full-line position of Figs. 1 and 2 to the dotted-line position of Fig. 2, and the crane 10 is moved to bring the vacuum frame above the table 6. The motor 32 is then started, thus lowering the frame 18 until the rubber cups 35 engage the surfaces of the pieces of glass. The motor is then stopped and the vacuum connections are opened so as to produce suction in all of the suction cups simultaneously except in those cups which may have been cut out by means of the valves 50 on account of their position above the cracks between the plates A. The suction thus applied to the plates draws the glass vertically until the upper surfaces of the plates engage the lower edges of the angle bars 20 as shown on Fig. 7, and since the lower edges of these bars are at the same level the upper surfaces of all of the plates A are likewise at the same level. The motor 32 may then be started in the reverse direction to raise the frame 18 to its starting position, or at least to such a position that the glass is free from the table 6 and is also above the level of the plaster on the table 2 to which the glass is to be transferred.

The crane 10 is then moved along the tracks 8, carrying with it the vacuum frame and the pieces of glass, until the frame is in the dotted-line position shown in Fig. 2 immediately above the table 2 which has previously been covered with plaster in the usual manner. By again starting the motor 32 the frame 18 is lowered until the glass is embedded in the plaster, after which the motor is stopped and the frames 10 and 18 are swung horizontally by hand for the purpose of forcing the air from beneath the glass as in the ordinary swimming operation. This horizontal movement need be only a few inches in each direction, and is permitted by the loose connections at the upper and lower ends of the suspension rods 13. The swinging frame is then allowed to remain stationary until the plaster, shown at B, Fig. 7, is set sufficiently to support the glass, after which the vacuum is released, the frame 18 is lifted, and the crane 10 returns the frame to its starting position ready to transfer another table of glass which may be prepared on the table 6 while the first set of plates is being transferred and laid. The table 2 is then moved forward on the tracks 4 and is replaced by a new table which is covered with plaster just before the crane brings the next set of plates from the assembling table 6.

A sufficient number of the vacuum cups is provided to insure that plates of any size or shape shall be properly lifted and transported. It may happen that some of the vacuum cups do not extend far enough from the edge of one of the plates to have any lifting effect upon it, as shown for example in Fig. 6, where the suction cup at the left of this figure is in proper engagement with the thick plate but does not exert any suction upon the thinner plate. However, there are sufficient cups engaging the remainder of the thinner plate A, as indicated in the right of Fig. 6, to properly engage this plate and raise it to the proper position shown in Fig. 7.

The arrangement described above may be modified by omitting the crane 10 and supporting the frame 12 in a stationary position above the tracks 4 at the position of the table 2 shown on Fig. 1. The tracks 5 in this case are made to cross the tracks 4 so as to enable the table 6, with its load of glass, to be run under the stationary vacuum frame. After the glass is picked up by the suction cups, the table 6 is withdrawn from beneath the frame and the table 2 is moved under the frame and receives the glass in the manner described above.

Another modification consists in arranging the tracks 4 and 5 parallel or inclined to each other instead of at right angles, as shown in the drawings. Such arrangements may be convenient where space is not available for tracks laid at right angles.

The details of construction shown above are well suited for use in carrying out my invention, but it will be understood that my invention is not restricted to the particular construction herein shown but may be carried out by means of any other suitable apparatus.

I claim as my invention:

1. The method of laying flat glass on a grinding or polishing table that comprises lifting a plurality of pieces of glass by means of suction applied to the upper surface of the glass and fixedly limiting the relative upward movement of the upper surfaces of the said pieces so as to bring all of the said upper surfaces to the same level.

2. The method of laying flat glass on a grinding or polishing table that comprises covering the entire surface of the grinding or polishing table with pieces of glass simultaneously, with their upper surfaces in a common plane, by means of suction applied to the upper surfaces of the said pieces of glass.

3. The method of laying flat glass on a grinding or polishing table that comprises covering the entire surface of the grinding or polishing table with pieces of glass simultaneously by means of suction applied to the upper surfaces of the said pieces of glass, the upper surfaces of the glass being held in the same horizontal plane by means of said suction, and moving all the pieces of glass simultaneously, to eliminate the air which may be under the said pieces of glass.

4. The method of assembling flat objects for grinding or polishing that comprises placing a plurality of the objects upon a flat support, covering another support with a layer of adhesive, lifting said objects by means of suction applied to their upper surface, placing the said objects upon the said adhesive-coated support, permitting the said adhesive to set, and then releasing the said suction.

5. The method of laying flat glass on a grinding or polishing table that comprises placing a plurality of pieces of glass side by side upon a support, covering a grinding or polishing table with a layer of plaster and transferring all of the said pieces of glass simultaneously from said support to said table by means of suction applied to the upper surface of the glass.

6. The method of laying flat glass on a grinding or polishing table that comprises placing a plurality of pieces of glass side by side upon a support, applying suction to the upper surfaces of the said pieces and bringing the said surfaces to the same level by means of the said suction.

7. The method of laying flat glass on a grinding or polishing table that comprises placing a plurality of pieces of glass side by side upon a support, applying suction to the upper surfaces of the said pieces, bringing said surfaces to the same level by means of the said suction, covering a grinding or polishing table with a layer of plaster, and transferring the glass to the said table while the glass is still held by suction.

8. The method of laying flat glass on a grinding or polishing table that comprises placing a plurality of pieces of glass side by side upon a support, applying suction to the upper surfaces of the said pieces, bringing said surfaces to the same level by means of the said suction, covering a grinding or polishing table with a layer of plaster, transferring the glass to the said table while the glass is still held by suction, lowering the glass into the said plaster, moving the glass horizontally while in contact with the said plaster, then holding the glass stationary until the plaster has set sufficiently to support the glass and then releasing the said suction.

9. The method of laying flat glass on a grinding or polishing table that comprises assembling a plurality of pieces of the glass upon a support, bringing the said support beneath a suction lifter, preparing a grinding or polishing table with a coating of plaster, lifting said pieces of glass by means of the said suction lifter, transferring the glass to a position above the said table, lowering the glass into contact with the plaster, moving the glass horizontally to remove air from beneath the glass, holding the glass stationary until the plaster sets sufficiently to support the glass, and then releasing the glass from the said suction lifter.

10. The method of laying flat glass on a grinding or polishing table that comprises assembling a plurality of pieces of glass upon a support of the same shape as the table upon which the glass is to be ground or polished, bringing the said support beneath a suction lifter, preparing a grinding or polishing table with a coating of plaster, lifting the glass by means of the said suction lifter, limiting the relative upward movement of the glass so as to bring all of the upper surface of the glass to the same level, transferring the suction lifter and the glass to a position above the said table, lowering the glass into contact with the plaster, moving the glass laterally to remove air from beneath the glass, permitting the glass to remain stationary until the plaster has set sufficiently to support the glass, and then releasing the said suction lifter from the glass.

11. The method of laying flat glass on a grinding or polishing table that comprises assembling a plurality of pieces of the glass upon a support, bringing the said support beneath a suction lifter, lifting said pieces of glass by means of said suction lifter, preparing a grinding or polishing or grinding table with a coating of plaster, removing said support, bringing said coated table beneath said suction lifter, lowering the glass into contact with the plaster, moving the glass horizontally to remove air from beneath the glass, holding the glass stationary until the plaster sets sufficiently to support the glass, and then releasing the glass from the said suction lifter.

In testimony whereof we the said FRANK E. TROUTMAN and CHARLES H. CHRISTIE have hereunto set our hands.

FRANK E. TROUTMAN.
CHARLES H. CHRISTIE.